June 12, 1951  J. A. KELLER  2,556,925
SHOCK ABSORBER

Filed March 12, 1947  2 Sheets-Sheet 1

INVENTOR.
J. A. Keller
BY Robb & Robb
attorneys

June 12, 1951  J. A. KELLER  2,556,925
SHOCK ABSORBER

Filed March 12, 1947  2 Sheets-Sheet 2

INVENTOR.
J. A. Keller
BY Robb & Robb
Attorneys

Patented June 12, 1951

2,556,925

UNITED STATES PATENT OFFICE 2,556,925

SHOCK ABSORBER

Joseph Adreon Keller, Edgerton, Wis., assignor to Highway Trailer Company, Edgerton, Wis., a corporation Application March 12, 1947, Serial No. 734,148

10 Claims. (Cl. 267—35)

My present invention comprises a novel spring or shock absorber device adapted particularly for use in vehicle suspension, and like applications.

One of the objects of my invention is to provide a spring or shock absorbing device utilizing the inherent resilient characteristics of rubber or like material in combination with the cushioning characterisctis of atmospheric air.

Another object of my invention is to provide such a device utilizing the resilient and shock absorbing characteristics of air and rubber, wherein the atmospheric air is automatically introduced to the device in the operation thereof.

Another object of the invention is to provide a combination air and rubber spring or shock absorbing device of simple construction requiring no auxiliary supply of air and utilizing air supply from the atmosphere.

Another object of the invention is to provide a combination air and rubber spring or shock absorbing device of novel construction eliminating parts and auxiliary equipment required in devices of this type heretofore known.

Another object of the invention is to provide a combination air and rubber spring or shock absorbing device wherein rubber is utilized as a primary suspension medium with the introduction of air for cushioning effect under conditions of full load, over-load, or shock load.

In general, the novel spring or shock absorber device of my invention comprises a plurality of rubber or like members having the characteristics of resiliency normally attributed to soft rubber, which members are designed to cooperate with one another to provide a substantially integral cushion unit having a plurality of separated air spaces between individual of said members and having air passages leading from said air spaces to the atmosphere, the design of said members in their interrelation as a unit being such as to cause introduction of air to said air spaces and withdrawal therefrom to the atmosphere upon loading and rebound conditions, under certain of which air introduced from the atmosphere is caused to be trapped in said air spaces provided by the inherent resiliency of the rubber members.

Other objects, advantages, and features of the invention will appear from the following detail description taken in conjunction with the accompanying drawing, in which.

Figure 1:
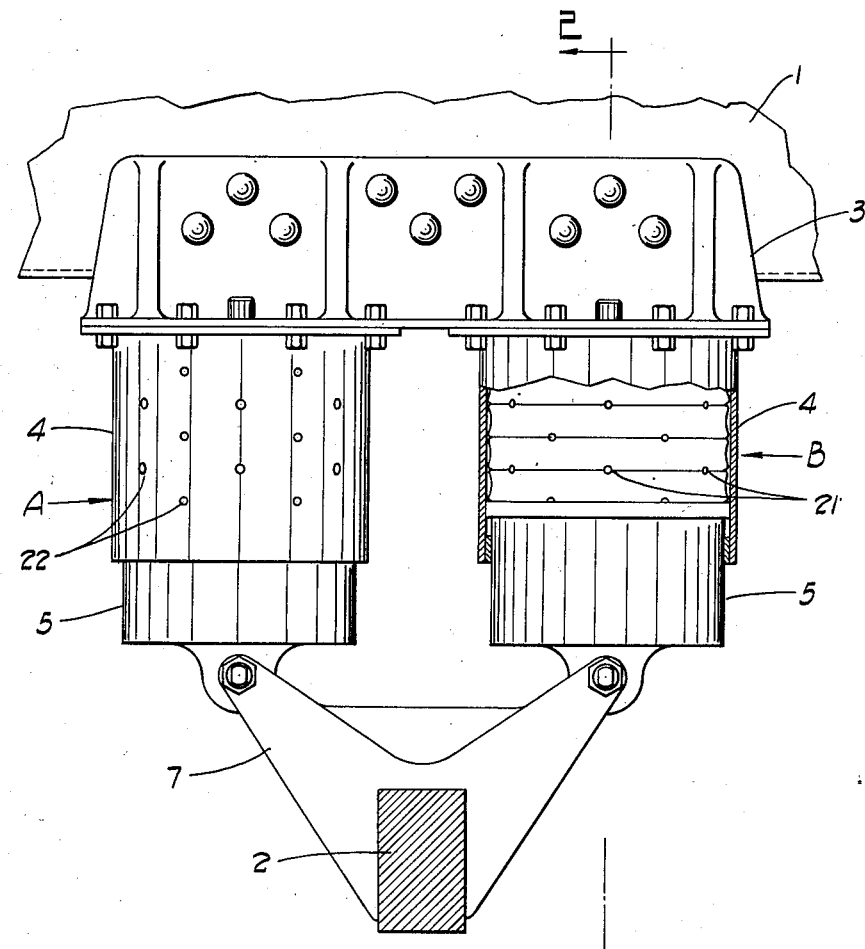
Figure 1 is a side elevational view of a vehicle suspension unit embodying my invention, shown as applied to the suspension of a vehicle chassis upon a wheel axle, certain portions of this view being shown in section.
Figure 3:
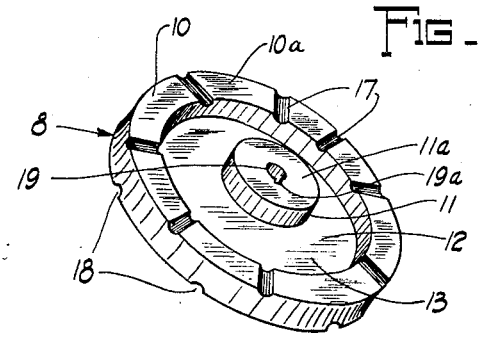
Figure 3 is a top perspective view.
Figure 2:
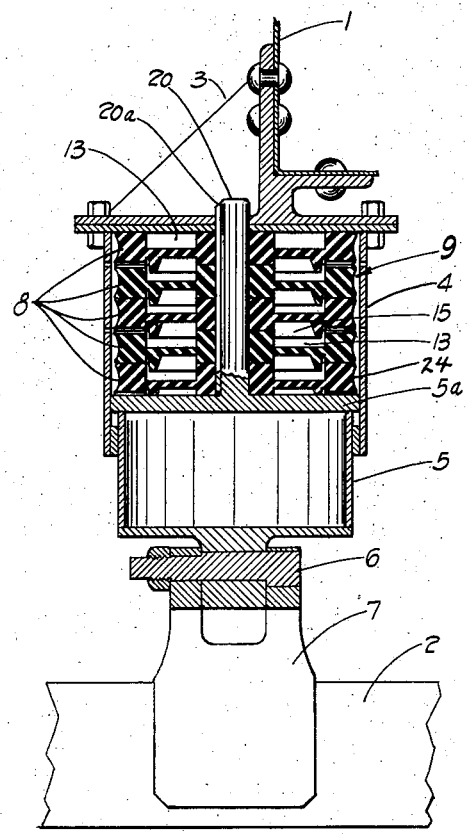
Figure 2 is a vertical sectional view taken substantially on the line 2—2 of Figure 1.
Figure 4:
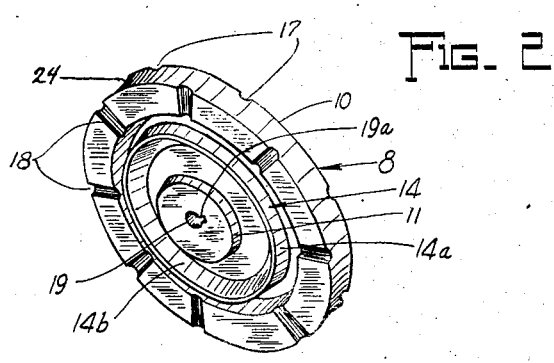
Figure 4 is a bottom perspective view of one of the individual rubber or like members, a plurality of which are adapted to comprise the cushion unit of the device.

Now referring to the drawings, Figures 1 and 2 show a vehicle suspension unit embodying my invention as applied to the supporting of a vehicle chassis resiliently upon a wheel axle. In these figures the numeral 1 represents one of the longitudinal frame members of the chassis of a truck or other wheeled vehicle, the wheel axle of which is designated 2. To the chassis frame 1 is suitably secured a bracket 3 supporting a cylinder 4 within which is carried a piston 5 adjustably secured by means of an eccentric pin 6 to a bracket 7 which in turn is welded to the axle 2. As shown in Figure 1, the suspension unit illustrated utilizes two of the piston and cylinder units as just described, said units being designated A and B, each of the units being identical and each having its cylinder 4 secured to the bracket 3 and its piston member 5 adjustably secured to the bracket 7 as above described. Each of the cylinder members 4 has incorporated therein a cushion unit comprising a plurality of rubber or like members individually designated by the numeral 8, the cushion unit as a whole being designated by the numeral 9. The cushion unit 9 comprising the rubber or like members 8 is interposed between the upper end or head of the cylinder 4, and the face plate 5a of the piston 5.

The individual rubber or like members 8 are each formed with an outer peripheral ring portion 10, a central hub portion 11, and a thinner web portion 12 interconnecting the portions 10 and 11. The upper edge 10a of the second outer ring portion 10 is flush with the upper edge 11a of the hub portion 11. Likewise the bottom edges of the portions 10 and 11 are flush. The web 12 extends between the portions 10 and 11 at a position spaced from the upper and lower edges of the portions 10 and 11 of the member 8, whereby the upper side of the member 8 is provided with a depression or space 13 intermediate the portions 10 and 11. Each of the rubber or like members or discs 8 is provided with a bottom inner ring portion 14 integral with and extending from the bottom of the web 12, the lower or bottom edge of the inner ring portion 14 extending below the lower or bottom edges of the portions 10 and 11, whereby, when two or more of the members or discs 8 are assembled together as shown in Figure 2, the bottom inner ring portion 14 extends within the space 13 intermediate the portions 10 and 11 at the upper side of the next adjacent member 8. The outer wall 14a and the inner wall 14b of the bottom inner ring portion 14 are both tapered so as to converge toward their lower edge of the portion 14, the inner wall 14b having a greater angle of taper from the vertical than the angle of taper of the outer wall 14a, whereby to improve the sealing action of the ring 14 under compression by causing rubber to flow radially outwardly from the center of the respective disc or member 8.

The lower inner ring 14 provides an inner cup or air space 15 intermediate the same and the portion 11.

Said bottom inner ring portion 14 also forms an outer space 16 intermediate said ring portions 10 and 14. The upper and lower edges of the outer ring portion 10 are provided with alternately spaced radial grooves 17 and 18. The outer periphery of the members 8 is concave to provide annular grooves 24 in said members to allow for peripheral flow of the rubber or other resilient material of the disc or member 8 under compression and to reduce friction against any outer container for said member.

As seen in Figures 1 and 2, a plurality of the members 8 are assembled together to form a cushion unit 9, five of said members 8 comprising the cushion unit 9 shown in Figure 2, said members 8 being assembled together so that the bottom inner ring portion 14 of one member 8 is received within the upper air space or depression 13 of the next adjacent lower member 8. The members 8 are provided with suitable alining means such as the provision of a keyway 19a in the axial passage 19 through the hub portion 11, so that the members 8 can be assembled in proper alinement upon a keyed rod or shaft 20 which is integral with the base plate 5a of the piston 5, key 20a cooperating with keyways 19a.

When a plurality of the members or discs 8 is assembled upon the alining rod or shaft 20 to form the cushion unit 9 as shown in Figure 2, with the portions 10 and 11 of adjacent members 8 abutting one another and the lower ring portion 14 of one member 8 extending within the upper depression or air space 13 of the next adjacent lower member 8, the alinement of said members 8 is such that the grooves 18 of one member 8 match the grooves 17 of the next adjacent lower member 8 to provide air passages 21 leading to the air spaces interiorly of the cushion unit formed by respective depressions in the lower and upper sides of adjacent members 8. Figure 2 illustrates the condition of the members 8 upon assembly to form the cushion unit 9 and before said cushion unit 9 is placed under load. In this condition illustrated it will be seen that the air passages 21 (formed by matching grooves 18 and 17 of adjacent members 8) provide communication between the air spaces interiorly of the cushion unit 9 and the outside atmosphere through the holes 22 in the perforated cylinder 4, so that air from the outside atmosphere may enter the air spaces interiorly of the cushion unit 9.

Now when the pile of members 8 forming the cushion unit 9 is placed under static load, each of the members 8 deflects in compression in proportional amount. Under full static load, the bottom inner ring 14 of each member 8 is tightly seated on the web 12 of the next adjacent disc 8. As the kinetic load is applied under operative conditions of use of the suspension unit, the members 8 rebound and deflect alternately to produce a bellows effect in reference to the air spaces between successive members 8. On a rebound the differential in pressure occurs, sucking air in from the atmosphere through the radial passages 21 to the air spaces between the successive members 8, and on the successive deflection of the members 8, the air so introduced to the air spaces therebetween is trapped by the sealing action of the bottom inner ring 14 upon the web 12 of the adjacent member 8, thereby compressing the air between the members 8 and producing a cushioning effect upon the suspended member. Shock is thus dampened out and the use of helper springs or bumpers is eliminated. The compression of air will also absorb some of the static load at full static load and overload.

It will be understood, of course, that the piston 5 and integral alining stem 20 will move up and down relative to perforated cylinder 4 under operative conditions of use of the suspension unit, the cushion unit 9 serving to support the load of the vehicle relative to the axle 2 and to effect cushioning action therebetween in the manner above described.

It will be seen from the foregoing that when the resilient members 8 are assembled together in the manner of Figure 2, they form a cushion unit comprising substantially a unitary body of resilient material having a plurality of separated air chambers therein, the cooperating grooves 17 and 18 forming passages 21 providing means of communication for air between said air chambers and the outside atmosphere, and the bottom ring portions 14 providing means positioned within said air chambers and cooperable with the adjacent resilient member 8 upon compression of portions of one or both of said adjacent members 8 adjacent their respective air chambers to close off the chamber from communication with the atmosphere and thereby trap air within said chamber to provide an air cushion supplementing the cushioning effect of the resilient body of material forming the cushion unit 9.

It will be apparent that the resilient members 8 may be composed of soft rubber or other material having like characteristics of resiliency.

Under operative conditions of use of the device, with unit 9 under such load as to cause ring 14 of each member 8 to be seated upon web 12 of the next adjacent member 8, the greater angle of taper of walls 14b (as compared with the taper of walls 14a) causes the resilient material of the rings 14 to flow outwardly under compression, thereby improving the sealing or seating action.

The concave or annularly grooved periphery 24 of each member 8 allows for peripheral flow of the rubber or like material under compression and reduces friction of said member 8 against cylinder 4.

Having thus described my invention, what I claim as new and desire to secure by Letters Patent of the United States is:

1. A shock absorber device of the class described, comprising a body of resilient material having an air chamber therein, said body of material formed with a ring portion integral with and extending from one wall of said chamber interiorly thereof, and means normally providing communication for air between said chamber and the outside atmosphere, said ring portion being cooperable with another wall of said chamber, upon compression of the adjacent portion of said body, to close off said chamber from communication with the outside atmosphere and thereby trap air within said chamber.

2. A shock absorber device of the class described, comprising a cushion unit consisting of a pair of members composed of resilient material, said members being formed with opposed concaves faces to provide, when assembled in cooperative relation, an air chamber therebetween, and means normally providing communication for air between said chamber and the outside atmosphere, and one of said members being provided with means separate from said communicating means, operative upon compression of said unit to close off said chamber from communication with the outside atmosphere and thereby trap air within said chamber.

3. A shock absorber device of the class described, comprising a cushion unit consisting of a pair of members composed of resilient material, said members being formed to provide, when assembled in cooperative relation, an air chamber and means normally providing communication for air between said chamber and the outside atmosphere, one of said members being provided with a ring portion engageable with the other of said members upon compression of said unit to close off said chamber from communication with the outside atmosphere and thereby trap air within said chamber.

4. A shock absorber device of the class described, comprising a cushion unit consisting of a pair of members composed of resilient material, said members being formed with opposed concave faces to provide, when assembled in cooperative relation, an air chamber therebetween and said members being formed with opposed cooperating grooves providing, when in cooperative relation a means for normally providing communication for air between said chamber and the outside atmosphere, and one of said members being provided with means operative upon compression of said unit to close off said chamber from communication with the outside atmosphere and thereby trap air within said chamber.

5. A shock absorber device of the class described, comprising a cushion unit consisting of a pair of members composed of resilient material, said members being provided with cooperating depressions forming, when assembled in opposed cooperative relation, an air chamber, and said members being formed with opposed cooperating grooves providing, when in cooperative relation a means for normally providing communication for air between said chamber and the outside atmosphere, and one of said members being provided with means operative upon compression of said unit to close off said chamber from communication with the outside atmosphere and thereby trap air within said chamber.

6. A shock absorber device of the class described, comprising a plurality of members composed of resilient material, said members being provided with cooperating depressions, forming, when assembled in cooperative relation, an air chamber, and said members being formed with cooperating grooves, providing, when in cooperative relation, means normally providing communication for air between said chamber and the outside atmosphere, one of said members being provided with a ring portion cooperable with the other of said members upon compression of a portion of one of said members adjacent said chamber to close off said chamber from communication with the outside atmosphere and thereby trap air within said chamber.

7. A shock absorber device comprising a cylinder member, a piston member operable therein, and a cushion unit interposed between one end of said cylinder interiorly thereof and said piston member, said cushion unit consisting of a pair of resilient members, said members being formed with opposed concave faces to provide, when assembled in cooperative relation, an air chamber and means normally providing communication for air between said chamber and the outside atmosphere, and one of said members being provided with means operative upon compression of said unit to close off said chamber from communication with the outside atmosphere and thereby trap air within said chamber, said cylinder member having openings therein providing communication between the interior of said cylinder member and the outside atmosphere.

8. A shock absorber device as claimed in claim 7, and an alining member on the piston member, said resilient members being provided with alining openings cooperable with the alining member to aline said resilient members in proper cooperative relation when assembled together.

9. A shock absorber device as claimed in claim 7, wherein the resilient members are provided with cooperating grooves, providing, when assembled in alined relation, the means normally affording communication for air between said chamber and the outside atmosphere.

10. A shock absorber device as claimed in claim 7, wherein said resilient members are each provided with an annular peripheral groove.

JOSEPH ADREON KELLER.

REFERENCES CITED

The following references are of record in the file of this patent:

UNITED STATES PATENTS

| Number | Name | Date |
|---|---|---|
| 87,307 | Sterne | Feb. 23, 1869 |
| 278,007 | Garsed | May 22, 1883 |
| 286,042 | Mayall | Oct. 2, 1883 |
| 1,641,856 | Lloyd et al. | Sept. 6, 1927 |
| 2,440,150 | Mitchell | Apr. 20, 1948 |

FOREIGN PATENTS

| Number | Country | Date |
|---|---|---|
| 20,421 | Great Britain | Dec. 31, 1892 |